United States Patent [19]
Adams et al.

[11] Patent Number: 6,144,295
[45] Date of Patent: Nov. 7, 2000

[54] AUTOMATIC CENTRAL TIRE INFLATION SYSTEM

[75] Inventors: Brian Adams, Urbana, Ill.; Geoffrey W. Schmitz, Wausau, Wis.

[73] Assignee: Case Corporation, Racine, Wis.

[21] Appl. No.: 09/210,561

[22] Filed: Dec. 11, 1998

[51] Int. Cl.[7] .................................................. B60C 23/00
[52] U.S. Cl. .................... 340/442; 73/146.3; 73/146.5; 137/224; 141/38; 340/443
[58] Field of Search .................... 340/442, 443, 340/447, 444; 152/417, 416, 415; 137/224; 141/38; 701/50; 73/146.5, 146.2, 146.3

[56] References Cited

U.S. PATENT DOCUMENTS

| | | | |
|---|---|---|---|
| 4,418,737 | 12/1983 | Goodell et al. | 137/224 |
| 4,619,303 | 10/1986 | Bryan et al. | 152/416 |
| 4,640,331 | 2/1987 | Braun et al. | 152/417 |
| 5,179,981 | 1/1993 | Hicks et al. | 340/442 |
| 5,589,815 | 12/1996 | Nishihara et al. | 340/444 |
| 5,629,873 | 5/1997 | Mittal et al. | 152/417 |
| 5,736,939 | 4/1998 | Corcoran | 340/442 |
| 5,749,984 | 5/1998 | Frey et al. | 340/444 |
| 5,839,801 | 11/1998 | Ferguson | 340/442 |

*Primary Examiner*—Brent A. Swarthout
*Attorney, Agent, or Firm*—Foley & Lardner

[57] ABSTRACT

A central tire inflation system for a work vehicle is presented. The central tire inflation system controls the inflation pressure in the tires of a work vehicle. The central tire inflation system may be placed in an automatic or manual mode. In the automatic mode, the system makes changes to the tire pressures according to the tire parameters, terrain conditions, and the operating loads placed on the tires.

26 Claims, 4 Drawing Sheets

AUTOMATIC CENTRAL TIRE INFLATION SYSTEM

FIELD OF THE INVENTION

The invention generally relates to work vehicles having a central tire inflation system provided to maintain proper tire inflation for the work vehicles. In particular, the invention relates to a central tire inflation system for a work vehicle supported by a set of inflatable tires, wherein the inflation pressure of the tires is automatically adjustable by the central tire inflation system to account for dynamic variations in operating loads placed on the tires under various loading conditions.

BACKGROUND OF THE INVENTION

Work vehicles including, but not limited to, agricultural work vehicles, such as tractors and combines, as well as construction vehicles, such as loaders and backhoes, are often supported by a set of inflatable tires. The inflation pressure of these inflatable tires can be adjusted to provide a substantially cushioned ride while providing adequate traction and support for the vehicle. Maintaining proper tire inflation provides better maneuverability and control of the work vehicle while minimizing the amount of vehicle slip, thereby increasing the amount of traction and power available for the work vehicle. Further, maintaining proper tire inflation reduces the amount of fuel necessary during operation of the work vehicle and provides improved tire wear, thereby providing substantial cost savings.

There are, however, a number of factors and conditions which cause work vehicles to be operated despite having non-optimal or improper tire inflation pressures. For example, tire inflation pressures typically decrease gradually over time due to low-level leaks and imperfect seals, and typically fluctuate as a function of temperature. In addition, the optimal tire inflation pressure will vary based upon the operating conditions of the work vehicle, such as the vehicle speed, the type of terrain, and the mission. In addition, the optimal tire inflation pressure will depend upon the operating loads placed on the tires under various operating conditions.

The traditional method of maintaining proper tire inflation pressures is to manually measure the inflation pressure of each tire and then, for each tire, to manually add air to increase pressure or to manually bleed air to decrease pressure. The effectiveness of the traditional method depends on the diligence of the operator in checking and adjusting the tire inflation pressures, and the manual method can be cumbersome due to the numerous tires found on many work vehicles. To address the drawbacks of the traditional method, central tire inflation systems operable from the operator's compartment or cab of the work vehicle have been developed for the military vehicle, commercial truck, and agricultural vehicle industries.

Existing central tire inflation systems allow the vehicle operator to view information regarding the tire inflation pressure and to manually adjust the tire inflation pressures using input devices. During operation, such existing central tire inflation systems may also maintain predetermined tire inflation pressures as set by the operator. Such existing central tire inflation systems, however, do not account for dynamic variations in the operating loads placed on the tires by weight transfers associated with implements attached to the work vehicles. The attached implements may include, for example, a mounted implement such as a plow mounted to a hitch assembly supported by an agricultural tractor, or a drawn implement such as a planter or other material spreader (e.g., a fertilizer or insecticide spreader) attached to a drawbar pulled by such a tractor. Such mounted or drawn implements exert varying loads on the tractor depending on, for example, the depth of the plow as it is being pulled through a field, or the amount of material remaining in the planter or spreader, or the condition of the surface including characteristics such as the soil type, soil moisture content, soil compaction, etc. The attached implements may also include a detachable header supported by an agricultural harvesting vehicle such as a combine or cotton picker. The load on the harvesting vehicle will vary due to the different masses and centers of gravity associated with different types of headers. In the construction vehicle field, the attached implements may include, for example, a bucket supported by a loading arm of a loader-backhoe vehicle. The load on the construction vehicle will vary not only because of the different masses and centers of gravity associated with different types of buckets or other implements, but will also vary with the amount of material (e.g., soil) being moved by the bucket.

Existing central tire inflation systems also fail to account for dynamic variations in load which occur during the operation of harvesting vehicles due to the storage of the harvested crop in containers or bins supported by the vehicle, and the unloading of the harvested crop from such bins, both of which significantly change the mass and center of gravity of the vehicle during field operations. In addition, varying vehicle speeds, terrain and missions all cause different tire inflation needs.

Thus, there is a need for a central tire inflation system that provides a manual mode wherein an operator may manually adjust the tire inflation pressures and an automatic mode wherein the pressures are automatically adjusted to account for variations in operating loads placed on the tires under various conditions. Also, there is a need for a central tire inflation system for a work vehicle which provides proper tire inflation pressures over varying combinations of load, speed, terrain and mission. There is also a need for a central tire inflation system for a work vehicle supported by inflatable tires, wherein the central tire inflation system can account for changes in tire loading due to varying loads placed on the work vehicle by attached implements, or by materials loaded into or unloaded from one or more storage bins supported by the work vehicle during operations of the work vehicle.

SUMMARY OF THE INVENTION

In one embodiment, the present invention relates to a central tire inflation system for a work vehicle supported by a set of inflatable wheels. The central tire inflation system includes a load transducer coupled to the work vehicle for generating sensed load signals representative of operating loads placed on the inflatable wheels and, an electronic control unit mounted on the work vehicle and coupled to the load transducer. The control unit receives the sensed load signals and generates control signals at least partly in response thereto. The system also includes an air supply capable of supplying pressurized air, at least two air lines coupled to the inflatable wheels, and an air manifold mounted on the work vehicle and coupled to the air supply, the at least two air lines, and the control unit. The air manifold receives the control signals from the electronic control unit. The control signals control actions of the air manifold to regulate the distribution and amount of pressurized air supplied to the at least two air lines from the air supply.

In another embodiment, the present invention relates to a work vehicle having a frame, an operator station and a propulsion system including at least two inflatable tires. The work vehicle includes at least one load sensor for generating sensed load signals representative of operating loads placed on the inflatable tires, an electronic control unit coupled to the load sensor for receiving the sensed load signals and for generating control signals at least partly in response thereto, an air supply capable of supplying pressurized air, at least two air lines coupled to the at least two inflatable tires, and at least two pressure transducers coupled to the inflatable tires. The pressure transducers supply electrical signals having a known relationship to sensed pressure in the tires to the control unit. The system also includes an air manifold coupled to the air supply, the at least two air lines, and the control unit. The air manifold receives the control signals from the electronic control unit. The control signals control actions of the air manifold to regulate the distribution and amount of pressurized air supplied to the at least two inflatable tires through the at least two air lines from the air supply.

In another embodiment, the present invention relates to a control system for controlling tire inflation pressure on a work vehicle. The work vehicle has at least two inflatable tires. The control system includes a microprocessor, an analog to digital converter coupled to the microprocessor, a digital to analog converter coupled to the microprocessor, and at least one load sensor input coupled to the analog to digital converter. The load sensor input receives electrical signals having a substantially known relationship to the load being carried by the at least two inflatable tires of the work vehicle. The system also includes an air manifold having at least one electrically controlled air valve, an air supply coupled to the air manifold, at least two air lines coupled to the at least one air valve and to the at least two inflatable tires, and an operator control unit coupled to the microprocessor. The operator control unit provides control inputs from an operator to the microprocessor, and the operator control unit communicates information regarding the state of the work vehicle to an operator.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENT

Figure 1:
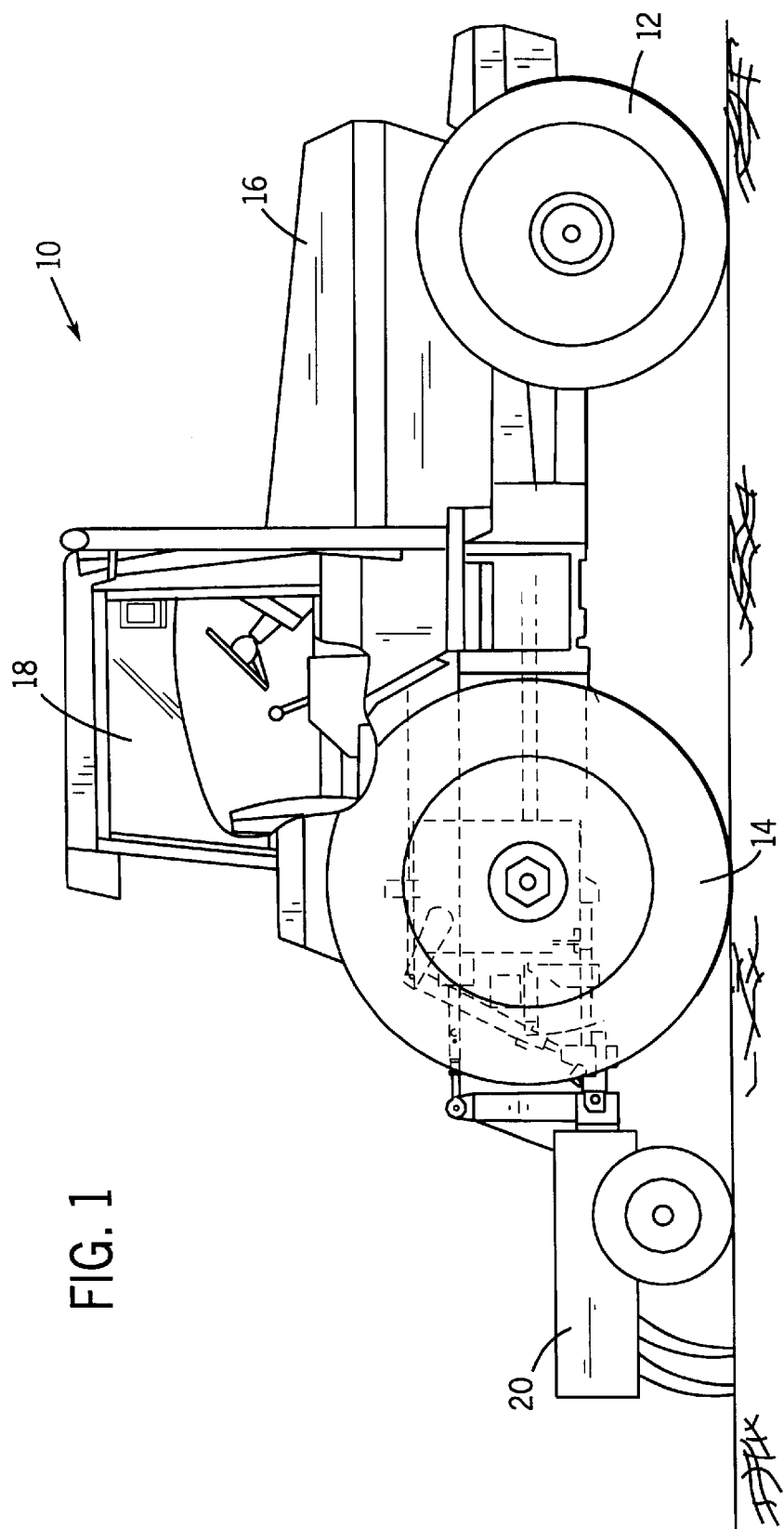
FIG. 1 is an elevational view of a tractor pulling a trailed implement.

Turning now to FIG. 1, a tractor 10 is shown, representative of work vehicles such as agricultural or construction vehicles. Tractor 10 is shown having front wheels 12, rear wheels 14, engine compartment 16, operator cab 18, and a trailed implement 20. Tractor 10 includes a central tire inflation system (CTIS) 25 (shown in FIG. 2) wherein the pressure in front wheels 12 and rear wheels 14 are controlled and monitored by the central tire inflation system. Engine (not shown) in engine compartment 16 transmits a propulsive force by an appropriate drive train to front wheels 12 and rear wheels 14, or to rear wheels 14 alone. Therefore, at least one of front wheels 12 and rear wheels 14 propel tractor 10.

Figure 2:
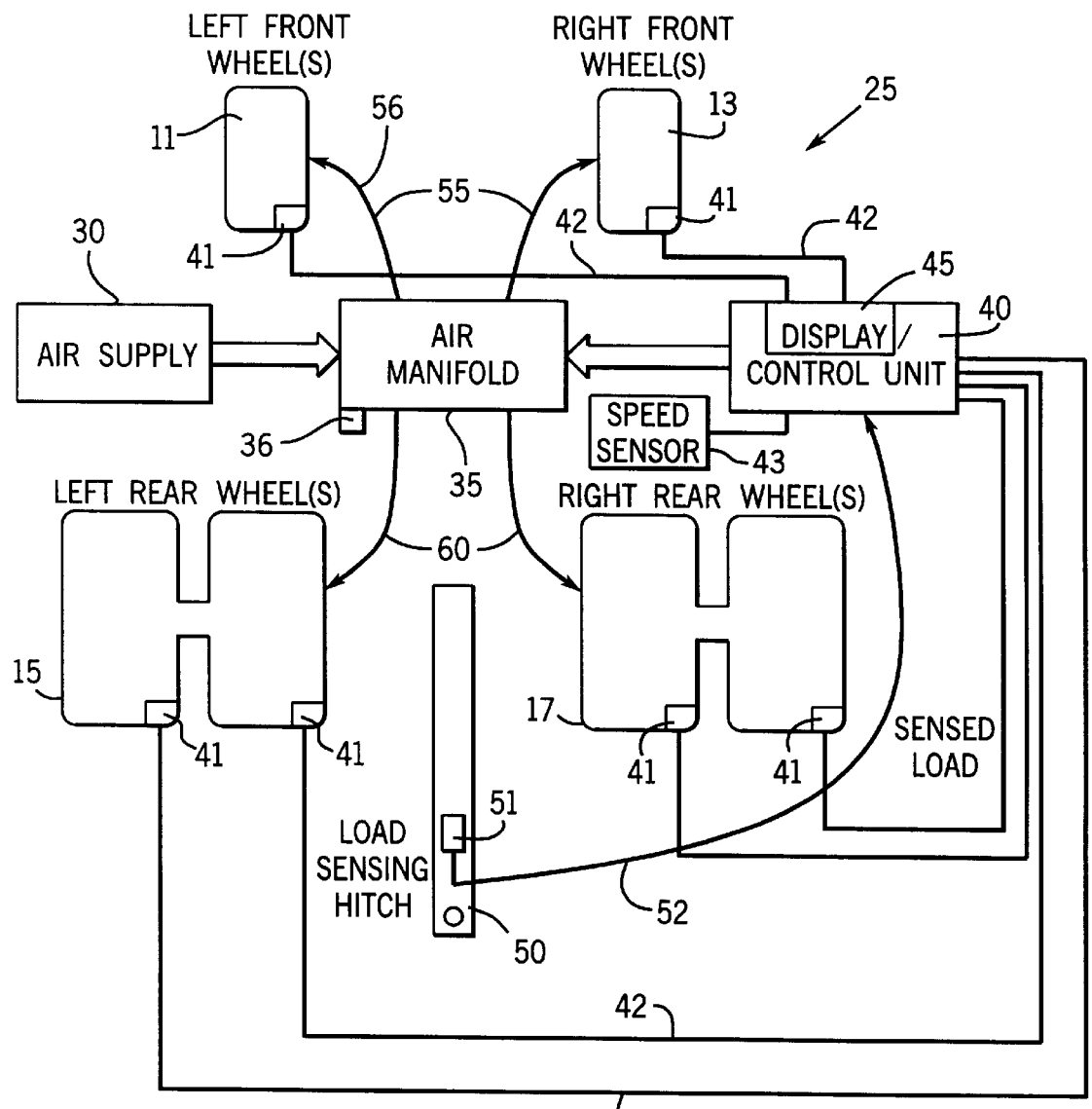
FIG. 2 is a schematic block diagram of a central tire inflation system.

Referring now to FIG. 2, central tire inflation system 25 includes left front wheel 11, right front wheel 13, left rear wheels 15, right rear wheels 17, an air supply 30, an air manifold 35, a control unit 40 having a display 45, a load sensing hitch 50, front air supply lines 55, and rear air supply lines 60. In a preferred embodiment, load sensing hitch 50 has a load transducer 51 that senses the load being carried by hitch 50 and communicates that information along a communication line 52 to control unit 40. Control unit 40 has at least two modes, a manual mode and an automatic mode. When control unit 40 is in the automatic mode, control unit 40 derives control signals to be supplied to air manifold 35 based at least partly on load sensed from load sensing hitch 50. When control unit 40 is in the manual mode, the control signals are derived based on the settings of operator input devices.

Control signals from control unit 40 control the actions of solenoid operated valves in air manifold 35, the valves controlling air flow to and from front wheels 11 and 13 and rear wheels 15 and 17 in a selective manner. For example, if control unit 40 demands that left front wheel 11 needs more pressure, an air valve in air manifold 35 is opened thereby causing pressurized air from air supply 30 to be delivered through air line 56 to left front wheel 11. Front wheels 11 and 13 and rear wheels 15 and 17 all have dedicated hub and axle combinations which allow delivery of air to the tires while still allowing rotation of the wheels and sealing the tires from substantial air leakage. If, for example control unit 40 demands that left front wheel 11 needs less pressure, an air release valve 36 in air manifold 35 is opened thereby drawing pressurized air from left front wheel 11 and causing a drop in pressure in left front wheel 11.

Figure 3:
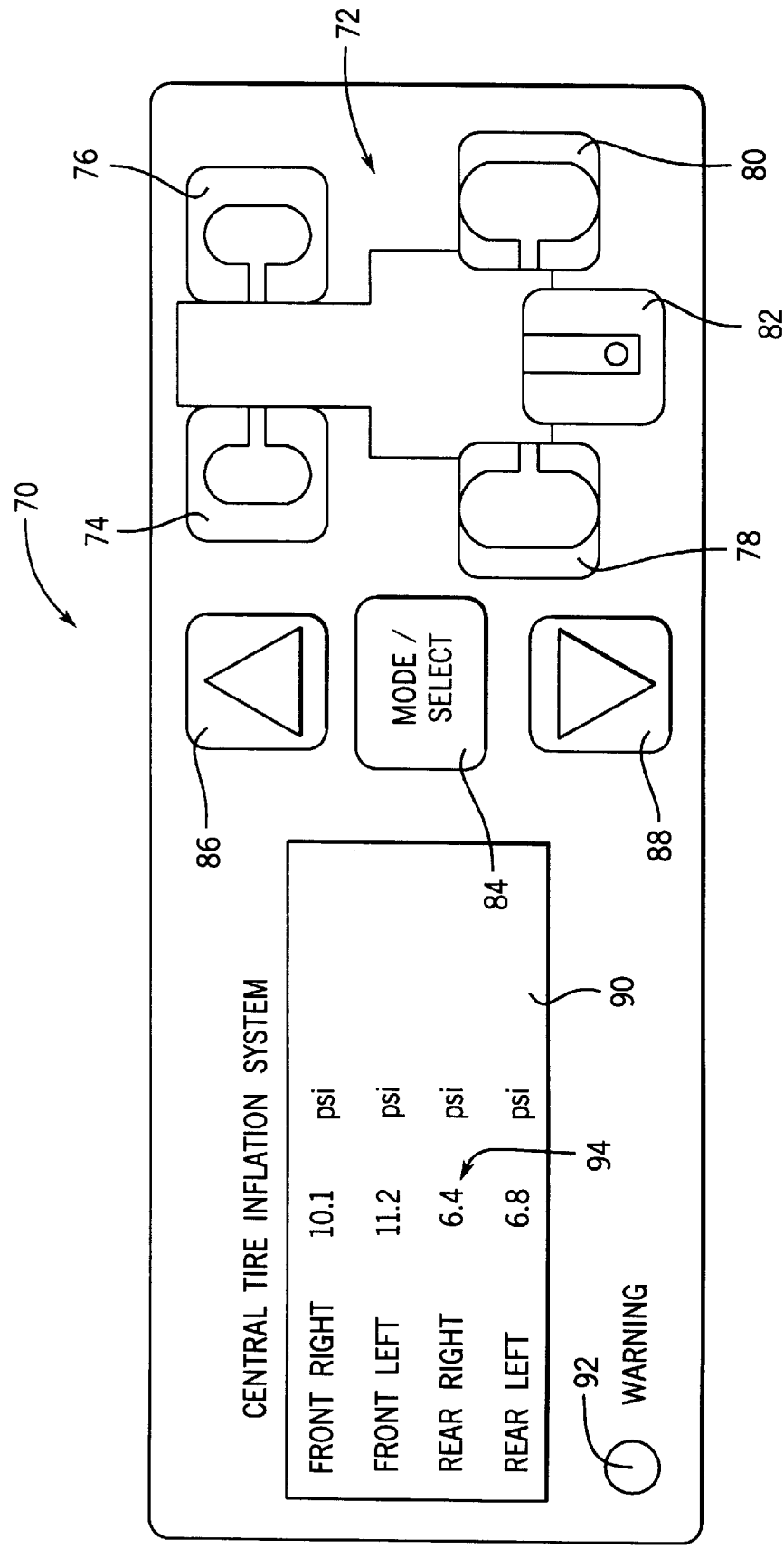
FIG. 3 is a plan view of a central tire inflation system user interface.

Referring now to FIG. 3, a user interface 70 is shown for controlling the behavior of central tire inflation system 25. User interface 70 includes a set of component activation buttons 72. In a preferred embodiment, component activation buttons 72 include a left front wheel button 74, a right front wheel button 76, a left rear wheel button 78, a right rear wheel button 80, and a load sensor button 82. User interface 70 further includes a mode select button 84, an increase increment button 86, a decrease increment button 88, an information display 90, and a warning light 92. Information display 90 allows the operator to view information relating to central tire inflation system 25 including tire inflation pressures 94, as shown, and other information (not shown) such as tire load and system status. By pressing mode select button 84, an operator may choose to manually adjust any of tire inflation pressures 94 shown on information display 90 by first choosing the appropriate wheel to inflate or deflate by pressing the corresponding component interface activation button 72. For example, if inflation is required in right front wheel 13, as shown in FIG. 2, right front wheel button 76 shown on user interface 70 of FIG. 3, is pressed. Once the desired wheel is activated, the pressure in the corresponding wheel may be varied by using increase increment button 86 or decrease increment button 88. As air pressure in right front wheel 13 is varied, the change is sensed by a pressure transducer 41 and displayed on information display 90.

By pressing mode select button 84, an operator may choose to place central tire inflation system 25 into an automatic mode. In automatic mode, a controller in control unit 40 monitors and controls the inflation of all tires in the system based at least partly on the operating loads placed on the wheels. Controller in control unit 40 may be a microprocessor based control or an analog control. Further, control unit 40 may be configured to carry out any of a number of regulating control algorithms including, but not limited to, PID control, PD control, proportional control, optimal control, linear quadratic regulation, digital control, intelligent control, fuzzy logic control, and any other suitable control algorithms.

Variations in the load placed on the tires which are caused by forces exerted on the vehicle during operation of an implement or other attachment can be measured by several different methods using different sensors and load transducers. In one embodiment, the load on the wheel axles is measured. For example, strain gauge load transducers are mounted on the axle housing to measure the vertical shear force. The vertical shear force on the axle, divided by the number of tires interconnected with the axle, determines the tire load.

In an alternative embodiment, tractor 10 has a suspension. Tire load is determined by knowledge of the suspension stiffness and by sensing the deflection of the suspension.

Further, in an alternative embodiment, a load pin is used on the front axles to measure load on front wheels 12. For example, a load pin can be inserted in the wheel pivots to measure the tire load.

Still further, in an alternative embodiment, tire loads are determined by measuring load on a hitch assembly (e.g., a three-point hitch assembly). The position and forces on members of the hitch assembly can be measured with strain gauges or load pins and position sensors that determine the line of draft of the implement. The operator calculates or measures the ballasted weight of the tractor and enters it into the control system. The weight transfer from the implement to the work vehicle can be calculated from the line of draft vector, sensed by the hitch sensors. From the line of draft vector, the actual working load on the axles can be calculated. Once the working load on the axles is calculated, the tire load can easily be determined by dividing the load on the axle by the number of tires interconnected with the axle.

Still further, in an alternative embodiment, tire loads are determined by measuring load on the trailed implement drawbar. The load on the drawbar can be measured using a strain gauge mounted on the drawbar, or by using another suitable device. By measuring the drawbar load, the line of draft vector can be determined. With the line of draft vector, the wheel loads may be calculated as described above for the hitch assembly.

Still further, loads on other work vehicle attachments (such as shovels, jack hammers, front-end loaders, etc.) contribute to wheel loads. These attachment loads can be accounted for in the total wheel load by including strain gauges or load pins at the mounting points of the attachments. For example, load pins used to couple a loader attachment and associated lift cylinders to the vehicle frame may measure the forces exerted by the loader attachment on the vehicle. The loader attachment position must also be measured to determine how the weight is transferred to the vehicle wheels.

Figure 4:
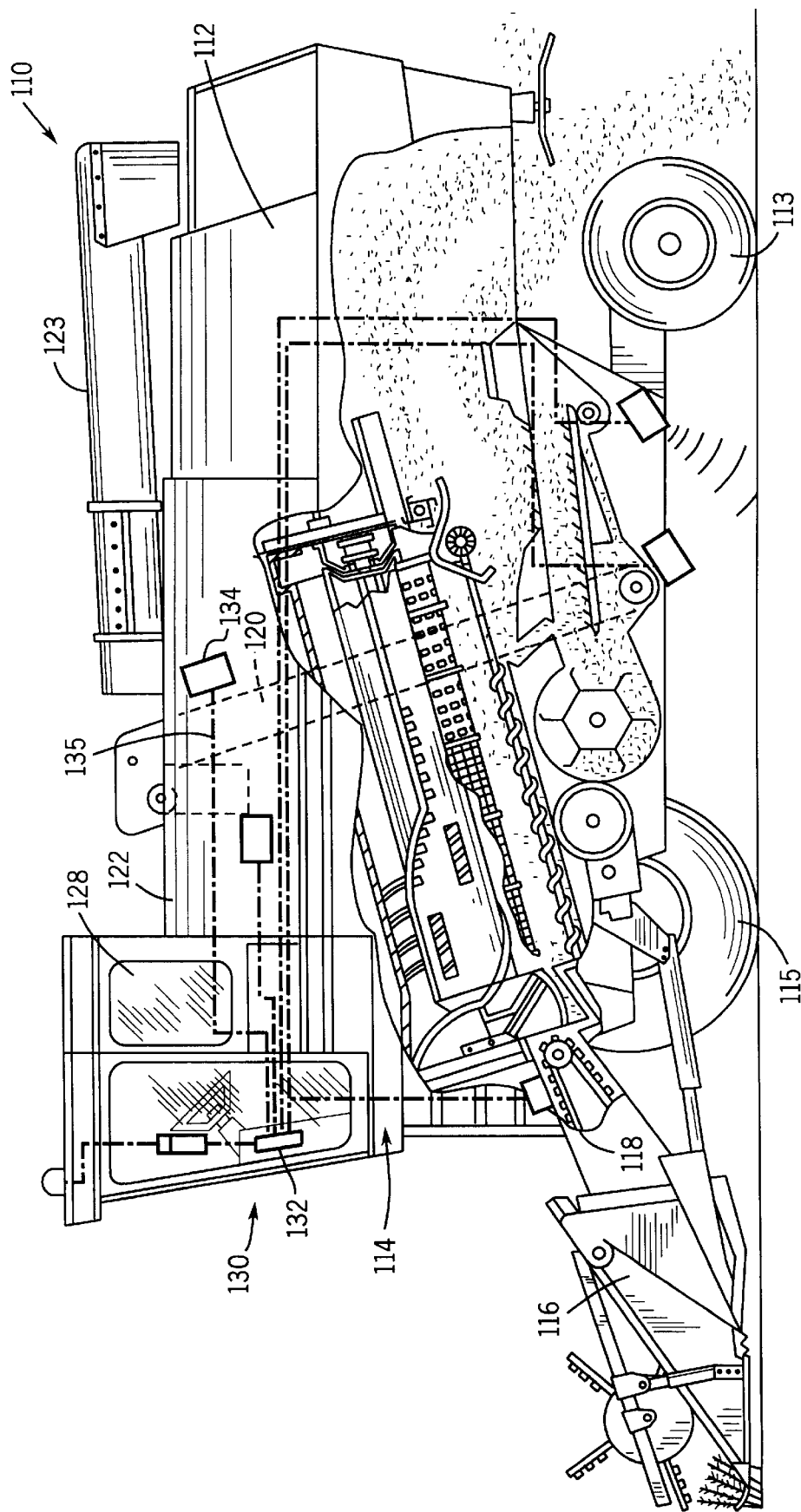
FIG. 4 is an elevational view of an agricultural combine.

Variations in tire load can also be caused by changes in the amount of material stored in one or more bins supported by the vehicle. For example, referring to FIG. 4 the load on the tires of an agricultural combine will change as harvested crop is loaded and unloaded. Agricultural combine 110 includes a harvest monitor system 130. Agricultural combine 110 is, for example, a combine such as the 2100S series of axial-flow combines made by Case Corporation of Wisconsin. Agricultural combine 110 includes a body 112, a cab 128, and a threshing and separating assembly 114 coupled to body 112. Threshing and separating assembly 114 receives the crop (e.g., wheat, corn) being harvested from a header 116 via a feeder 118. Once the crop is separated from the waste materials (e.g., chaff, tailings, straw, and other wastes) by threshing and separating assembly 114, the clean grain travels up a clean grain elevator 120 to a grain tank 122 or to an unloading auger 123 for discharge into a grain cart (not shown).

As combine 110 harvests material, the mass and center of gravity of combine 110 change significantly. Combine 110 includes a yield monitor 134 that measures the mass of the material harvested. Yield monitor or grain flow sensor 134 is preferably an impact-type mass flow rate sensor attached to a steel plate struck by grain passing through the clean grain elevator 120 which measures the force of the grain. Grain flow sensor 134 generates a grain flow signal indicative of the grain flow rate and transmits this grain flow signal via a communication bus 135 to harvest work controller 132, which may include a central tire inflation system such as central tire inflation system 25. Having only yield monitor information, the relationship for the change of the center of gravity can be empirically determined, since the relationship changes only slightly from load to load.

Header 116 is a detachable header corresponding to a particular harvesting procedure. Header 116 may be interchanged with other header types, each different header type having a significantly different mass and center of gravity, therefore the load on wheels 113 and 115 changes with respect to each different header. Each detachable header may have an identification tag that would indicate the weight and center of gravity of the header. Ideally the identification tag would be an electronic tag that would automatically indicate the center of gravity and weight of the header and communicate that information to central tire inflation system 25. Alternatively, the header can be weighed by sensing the pressure in the lift cylinders, but the center of gravity will still not be known. Therefore, strain gauges or load transducers could be added to the feeder housing to determine both the weight and center of gravity of the header.

For another example, the load on the tires of a dump truck will change depending on the amount and type of material being hauled. These changes in tire load can be sensed using appropriate sensors, and the sensed load can be used to adjust the inflation pressures of the tires.

Once the tire load has been determined, the speed, tire size, and tire rating, are all communicated to controller 40. This information is needed for the controller to provide commands to adjust the tire inflation pressure properly. In one embodiment, the vehicle speed is measured from wheel speed sensors or radar mounted on the vehicle. In one embodiment, the operator manually inputs the tire size and rating, however, the information may alternatively be obtained through a wireless device imbedded in the tires that communicates a signal to control unit 40.

In a preferred embodiment, the operator may choose a terrain or condition type by pressing mode/select button 84 and choosing the desired terrain or condition, displayed on display 45 (terrain or condition choices are not shown in FIG. 3). Increase increment button 86 and decrease increment buttons 88 can be used to change the selections. The terrain or condition choices may include, but are not limited to highway, field, mud, snow, or any other suitable conditions or terrains. Further, drive parameters, such as the fueling curve, the transmission, manual four wheel drive, differential locks, tire pressure, or other drive train parameters could be modified based on the terrain setting, vehicle slip, or vehicle load to provide increased traction and power.

When control unit 40 is in automatic mode and the proper parameters have been set, the individual tire loads will be measured or sensed, and control unit 40 determines the proper inflation pressure for the particular combination of load and speed from lookup tables provided by the tire manufacturers. Control unit 40 also receives sensed or measured tire pressure from pressure transducers 41 along communication lines 42. Based upon the measured tire pressure and the desired tire pressure, control unit 40 communicates a signal to air manifold 35 to inflate or deflate the tire appropriately.

In a preferred embodiment of the present invention, CTIS 25 has a warning light 92. Warning light 92 may flash, and a warning message may be displayed on display 45, to alert an operator of a problem or a potential problem with CTIS 25. In a preferred embodiment, warning light 92 flashes when the vehicle is operating too fast (as sensed by a speed sensor 43) for the given tire pressure and loads, for example. If the operator does not decrease the speed of the vehicle within a specified amount of time, the system will automatically begin to adjust the appropriate tires to the proper inflation pressure.

In a preferred embodiment, CTIS 25 indicates to the operator the severity and location of any leaks in the tires. The leak severity is determined by measuring the time rate of change of the pressure (sensed using pressure sensor or pressure transducer 41) in the tires. The system can compensate for small leaks by adding air to the tires as required. Further, if the pressure in the air supply to the manifold is too low, the system disables and warns the operator that CTIS 25 or other pneumatic systems, such as the brakes, may fail to function properly due to inadequate pressure in air supply 30.

Although only a few exemplary embodiments of this invention have been described above, those skilled in the art will readily appreciate that many modifications are possible in the exemplary embodiments without materially departing from the novel teachings and advantages of this invention. As is readily indicated, the invention can be employed in a variety of ways and using a variety of control architectures. Further, the type of work vehicle may be varied in so far as it has a CTIS system used to vary tire pressures. Accordingly, all such modifications are intended to be included within the scope of the invention as defined in the following claims. Other substitutions, modifications, changes, and omissions may be made in the design, operating conditions, and arrangement of preferred and alternative embodiments without departing from the spirit of the invention as expressed in the appended claims.

What is claimed:

1. A central tire inflation system for a work vehicle supported by a set of inflatable wheels the work vehicle couplable to an implement, the central tire inflation system comprising:

a load transducer coupled to the work vehicle and configured to sense a load of the implement and to generate load signals representative thereof;

an electronic control unit coupled to the load transducer configured to receive the load signals and to generate control signals at least partly in response thereto;

an air manifold configured to receive the control signals from the electronic control unit, the control signals controlling actions of the air manifold to regulate the air supplied to the set of inflatable wheels.

2. The central tire inflation system of claim 1, wherein the load transducer is configured to sense the operating loads placed on a hitch assembly of the work vehicle.

3. The central tire inflation system of claim 1, wherein the load transducer comprises at least one load pin, the load pin communicating an electrical signal to the electronic control unit, the electrical signal having a substantially known relationship to a force applied to the load pin.

4. The central tire inflation system of claim 1, wherein the electronic control unit is configured to generate display signals, the central tire inflation system further comprising:

a visual display coupled to the electronic control unit configured to provide central tire inflation system information to a user in response to the display signals; and a manual control input coupled to the electronic control unit for generating manual control signals, wherein, when the electronic control unit operates in a manual mode, the control signals provided to the air manifold are based upon the manual control signals.

5. The central tire inflation system of claim 1, further comprising:

at least one pressure transducer coupled to at least one of the inflatable wheels, the at least one pressure transducer supplying a sensed pressure signal to the electronic control unit, the sensed pressure signal having a substantially known relationship to pressure in at least one of the inflatable wheels;

wherein the electronic control unit generates the control signals at least partly in response to the sensed pressure signal.

6. The central tire inflation system of claim 1, wherein the implement is a header having lift cylinders operatively coupled thereto, the load transducer configured to sense a pressure in the lift cylinders and to generate the load signals based on the sensed pressure.

7. The central tire inflation system of claim 6 wherein the header has an identification tag having information related to the physical characteristics of the detachable implement, the physical characteristics being input to the electronic control unit.

8. A work vehicle having a bin for receiving a material and at least one inflatable tire, the work vehicle comprising:

sensing means for generating sensed load signals representative of operating loads placed on the work vehicle by the material;

an electronic control unit coupled to the sensing means and configured to receive the sensed load signals and to generate control signals at least partly in response thereto;

an air manifold configured to receive the control signals from the electronic control unit, the control signals controlling actions of the air manifold to regulate the air supplied to the at least one inflatable tire.

9. The work vehicle of claim 8, wherein the work vehicle further comprises a hitch assembly, the hitch assembly having at least one load sensor mounted thereon, the load sensor communicating an electrical load signal to the electronic control unit, the electronic control unit configured to generate the control signals based on the electrical load signal.

10. The work vehicle of claim 9, wherein the hitch assembly has a position sensor coupled thereto, the position sensor communicating an electrical position signal to the electronic control unit, the electronic control unit configured to generate the control signals based on the electrical position signal.

11. The work vehicle of claim 8, wherein the work vehicle has a draw bar and wherein the sensing means comprises at least one drawbar load sensor communicating an electrical load signal to the electronic control unit, the electronic control unit configured to generate the control signals based on the electronic load signal.

12. The work vehicle of claim 8, wherein the sensing means includes a yield monitor that communicates an electronic yield signal to the electronic control unit.

13. The work vehicle of claim 8, further comprising: a bin mounted to the work vehicle, wherein the bin is coupled to the sensing means, the sensing means sensing the load of material in the bin.

14. The work vehicle of claim 8, further comprising a speed sensor, the speed sensor communicating an electrical signal to the electronic control unit, the electronic control unit configured to generate the control signals based on the electrical signal.

15. The work vehicle of claim 8, wherein the electronic control unit comprises:

a manual control input configured to selectively provide electrical control signals to the air manifold, the air manifold configured to regulate air supplied to the at least two inflatable tires based on the electrical control signals.

16. The work vehicle of claim 12, wherein the sensing means further includes a mass flow rate sensor.

17. A method of regulating the tire pressure of a tire on a work vehicle, the work vehicle having a coupling configured for attachment to an implement, comprising:

sensing the load provided to the coupling by the implement;

generating control signals based on the load of the implement; and regulating the air supplied to the tire based on the control signals.

18. The method of claim 17, wherein the coupling is a drawbar.

19. The method of claim 17, further comprising generating a line of draft vector based on the load and calculating the actual working load on the tire based on the line of draft vector.

20. The method of claim 17, further comprising receiving additional control signals from a manually-operated switch and regulating the air supplied to the tire based on the additional control signals.

21. A method of regulating the tire pressure of a tire on a work vehicle, the work vehicle having a bin for receiving a material, comprising:

generating sensed load signals representative of operating loads placed on the work vehicle by the material;

generating control signals at least partly in response to the sensed load signals; and regulating the air supplied to the tire based on the control signals.

22. The method of claim 21, further comprising monitoring the yield of a harvested crop of the work vehicle and generating the control signals based on the monitored yield.

23. The method of claim 21, further comprising receiving additional control signals from a manually-operated switch and regulating the air supplied to the tire based on the additional control signals.

24. A central tire inflation system for a work vehicle supported by a set of inflatable wheels, the central tire inflation system comprising:

a load transducer coupled to the work vehicle for generating sensed load signals representative of operating loads placed on the inflatable wheels;

an electronic control unit mounted on the work vehicle and coupled to the load transducer, wherein the electronic control unit is configured to receive the sensed load signals and to generate control signals at least partly in response thereto;

an air supply capable of supplying pressurized air;

at least two air lines coupled to the inflatable wheels;

an air manifold mounted on the work vehicle and coupled to the air supply, the at least two air lines, and the control unit, wherein the air manifold receives the control signals from the electronic control unit, the control signals controlling actions of the air manifold to regulate the distribution and amount of pressurized air supplied to the at least two air lines from the air supply; and wherein the load transducer comprises at least one load pin, the load pin communicating an electrical signal to the electronic control unit, the electrical signal having a substantially known relationship to a force applied to the load pin.

25. The central tire inflation system of claim 24, wherein the load transducer is configured to sense a load provided to the work vehicle by an implement.

26. The central tire inflation system of claim 24, wherein the load transducer is configured to sense operating loads places on the work vehicle by a material.

* * * * *